US011047959B2

United States Patent
Hung et al.

(10) Patent No.: US 11,047,959 B2
(45) Date of Patent: Jun. 29, 2021

(54) APPARATUS AND METHOD FOR GENERATING MULTIPLE-WAVELENGTH DISTRIBUTED CONTINUOUS WAVE AND PULSE OPTICAL TRANSMISSION SIGNAL

(71) Applicant: Optilab, LLC, Phoenix, AZ (US)

(72) Inventors: Henry Hung, Phoenix, AZ (US); Leijun Yin, Phoenix, AZ (US); Andre Brewer, Phoenix, AZ (US)

(73) Assignee: Optilab, LLC, Phoenix, AZ (US)

( * ) Notice: Subject to any disclaimer, the term of this patent is extended or adjusted under 35 U.S.C. 154(b) by 417 days.

(21) Appl. No.: 15/897,518

(22) Filed: Feb. 15, 2018

(65) Prior Publication Data

US 2019/0250253 A1   Aug. 15, 2019

(51) Int. Cl.
| | | |
|---|---|---|
| *G01S 7/481* | (2006.01) | |
| *G01S 17/06* | (2006.01) | |
| *G02B 27/10* | (2006.01) | |
| *H01S 3/00* | (2006.01) | |
| *G02B 6/293* | (2006.01) | |
| *G02B 6/28* | (2006.01) | |
| *H01S 3/067* | (2006.01) | |
| *H01S 3/10* | (2006.01) | |

(52) U.S. Cl.
CPC .......... *G01S 7/4814* (2013.01); *G01S 17/06* (2013.01); *G02B 6/2804* (2013.01); *G02B 6/29304* (2013.01); *G02B 27/1006* (2013.01); *G02B 27/1086* (2013.01); *H01S 3/005* (2013.01); *H01S 3/06716* (2013.01); *H01S 3/1003* (2013.01); *H01S 3/06754* (2013.01); *H01S 3/10023* (2013.01)

(58) Field of Classification Search
CPC ...... G01S 7/4814; G01S 7/4815; G01S 7/484; G01S 17/06; G02B 6/2804; G02B 6/29304; G02B 27/1006; G02B 27/1086; H01S 3/005; H01S 3/06716
See application file for complete search history.

(56) References Cited

U.S. PATENT DOCUMENTS

| | | | |
|---|---|---|---|
| 9,350,452 B2 | 5/2016 | Hung | |
| 10,295,658 B2 * | 5/2019 | Torruellas | ............... G01S 17/10 |
| 2009/0303456 A1 * | 12/2009 | Paiva | ...................... G01S 17/87 |
| | | | 356/3 |

(Continued)

*Primary Examiner* — Eric L Bolda
(74) *Attorney, Agent, or Firm* — Loza & Loza, LLP; George L. Fountain (57) ABSTRACT

An optical signal transmitter configured to emit wavelength-distinct optical signals along distinct directions to provide a field scanning effect without requiring moving parts to effectuate the scanning. In one implementation, the optical signal transmitter includes a laser source for generating an optical signal including a set of distinct wavelengths, an optical amplifier configured to amplify the optical signal, a wavelength splitter configured to generate a set of optical signals consisting of distinct wavelengths, respectively, and a set of emission ports for emitting the set of optical signals in different directions. In another implementation, the wavelength splitting occurs at the set of emission ports. In yet another implementation, two stages of wavelength splitting are provided. The optical signal transmitter may be implemented in a LIDAR system for ascertaining information concerning objects-of-interests.

26 Claims, 5 Drawing Sheets

(56) References Cited

U.S. PATENT DOCUMENTS

| | | | |
|---|---|---|---|
| 2013/0242400 A1* | 9/2013 | Chen | G02B 27/0087 |
| | | | 359/618 |
| 2017/0153319 A1* | 6/2017 | Villeneuve | H01S 3/08086 |
| 2017/0272160 A1* | 9/2017 | Xu | H04J 14/0227 |
| 2018/0012372 A1* | 1/2018 | Takao | G01C 3/08 |
| 2018/0306925 A1* | 10/2018 | Hosseini | G01S 7/4813 |
| 2019/0109256 A1* | 4/2019 | Lee | G01S 7/4811 |
| 2019/0257927 A1* | 8/2019 | Yao | G01S 7/4815 |
| 2020/0049799 A1* | 2/2020 | Ando | G01S 7/4813 |

* cited by examiner

APPARATUS AND METHOD FOR GENERATING MULTIPLE-WAVELENGTH DISTRIBUTED CONTINUOUS WAVE AND PULSE OPTICAL TRANSMISSION SIGNAL

BACKGROUND

Field

Aspects of the present disclosure relate generally to optical systems, and in particular, to an apparatus and method for generating a multiple-wavelength distributed continuous wave (CW) and/or pulse optical transmission signal.

Background

Aspects of the present disclosure relate generally to optical systems, and in particular, to an apparatus and method for generating a multiple-wavelength distributed continuous wave (CW) and/or pulse optical transmission signal.

Light detection and ranging (LIDAR) systems (or sometimes referred to as "light imaging, detection, and ranging" systems) are typically used to detect and/or map a target object-of-interest. For example, LIDAR systems may be employed in vehicles to detect other vehicles and objects in proximity for collision warning and avoidance and/or autonomous navigation purposes. Another example is an airborne LIDAR system used for three-dimensional (3D) terrain mapping.

In a LIDAR system, a transmitter transmits an optical signal towards a target object-of-interest for detection and/or mapping purposes. The transmitted optical signal reflects off the target object and propagates back towards the LIDAR system. The LIDAR system includes a receiver, which detects the reflected optical signal and converts it into a digital signal for processing. Depending on the application, the LIDAR system may determine information about the target object, such as its distance, velocity, acceleration, surface contours, etc.

This disclosure relates to optical signal transmission and/or receiving systems that may be useful in many applications, including LIDAR systems as described above.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

An aspect of the disclosure relates to an apparatus including a laser source configured to generate an optical signal including a set of distinct wavelengths; and a set of emission ports configured to emit a set of optical signals consisting of the distinct wavelengths into free space, respectively, wherein the set of optical signals is based on the optical signal.

Another aspect of the disclosure relates to an apparatus including a laser source configured to generate an optical signal including a set of distinct wavelengths; a set of emission ports configured to emit a set of optical signals consisting of the distinct wavelengths into free space, respectively, wherein the set of optical signals is based on the optical signal; and a receiver configured to receive a second set of optical signals generated as a result of the set of optical signals reflecting off of an object, and process the second set of optical signals to generate information regarding the object.

Another aspect of the disclosure relates to a method including generating an optical signal including a set of distinct wavelengths; wavelength splitting the optical signal to generate a set of optical signals consisting of the distinct wavelengths, respectively; and emitting the set of optical signals into free space.

To the accomplishment of the foregoing and related ends, the one or more embodiments include the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the description embodiments are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

As discussed, a LIDAR system transmits an optical signal towards a target object and receives a reflected optical signal from the target object. As also discussed, the LIDAR system processes the received optical signal to determine one or more properties of the target object. As the target object may vary substantially in shape and composition, its optical reflection characteristics vary accordingly. For example, the optical reflection characteristics of a target object may vary based on the wavelength of the transmitted optical signal. The detection and processing of the reflected optical signal may also vary depending on whether the transmitted optical signal is a continuous wave (CW) optical signal or a pulsed optical signal.

In time-of-flight applications, an unambiguous pulse is needed to determine the distance of an object. An unambiguous pulse is a reflected pulse received from an object that can be correlated with a corresponding transmitted pulse. As an example, if two pulses are transmitted at times t1 and t2 and two reflected pulses are received at times t3 and t4, the LIDAR system needs to know that the received pulse at time t3 resulted from a reflection of the pulse transmitted at time t1, and the received pulse at time t4 resulted from a reflection of the pulse transmitted at time t2. However, depending on the object, the received pulse at time t3 may have been the result of the reflection of the pulse transmitted at time t2, and the received pulse at time t4 may have been the result of the reflection of the pulse transmitted at time t1. If the LIDAR system cannot correlate the received pulses with the transmitted pulses, errors will be introduced in the distance measurement of the object.

Both the intrinsic speed of light and the desired range of the LIDAR system limit the pulse achievable pulse rate when a single wavelength is used. This is because to achieve an unambiguous pulse the reflected pulse needs to be received before the next pulse is transmitted. However, using distinct wavelengths (e.g., distinct narrow wavelength bandwidths to be specific) allows for an increase in the number of pulses that can be unambiguously detected by a single detector, proportional to the number of distinct wavelengths (e.g., narrow wavelength bandwidths) emitted. As an example, if two pulse at different wavelengths are transmitted at times t1 and t2, and two reflected pulses are received at time t3 and t4, the LIDAR system can correlate the received pulses with the transmitted pulses based on the wavelengths of the received pulses. That is, the received pulse with a particular wavelength corresponds to the transmitted pulse with substantially the same wavelength (e.g., the same or within a defined deviation due to doppler effects associated with the object).

Thus, to improve the reception, detection, and processing of reflected optical signals from distinct target objects, it is desirable that the LIDAR system is able to transmit optical signals with a wide variety of wavelengths and other associated characteristics, such as continuous wave and/or pulse, to create unambiguous signals. If pulsed, the transmitted optical signal should be configured to have a programmable pulse repetition rate or a desired time-based pattern, and a programmable pulse shape, such as pulse width and transition slew rates. Additionally, as a target object may be wide in shape, it is desirable that the LIDAR system is able to produce spatially-diverse optical signals without requiring a mechanical-motion-based scanning system to reduce power, wear and tear, footprint, weight, and costs associated with such scanning system. Accordingly, the system described herein can eliminate scanning by spatial and temporal distribution, or, can expand capabilities of typical LIDAR systems by lowering the mechanical sweep necessary at each emission port. Therefore, the system can essentially power multiple LIDAR emission systems, can power multiple multi-wavelength LIDAR systems, or act as one distributed system.

Figure 1:
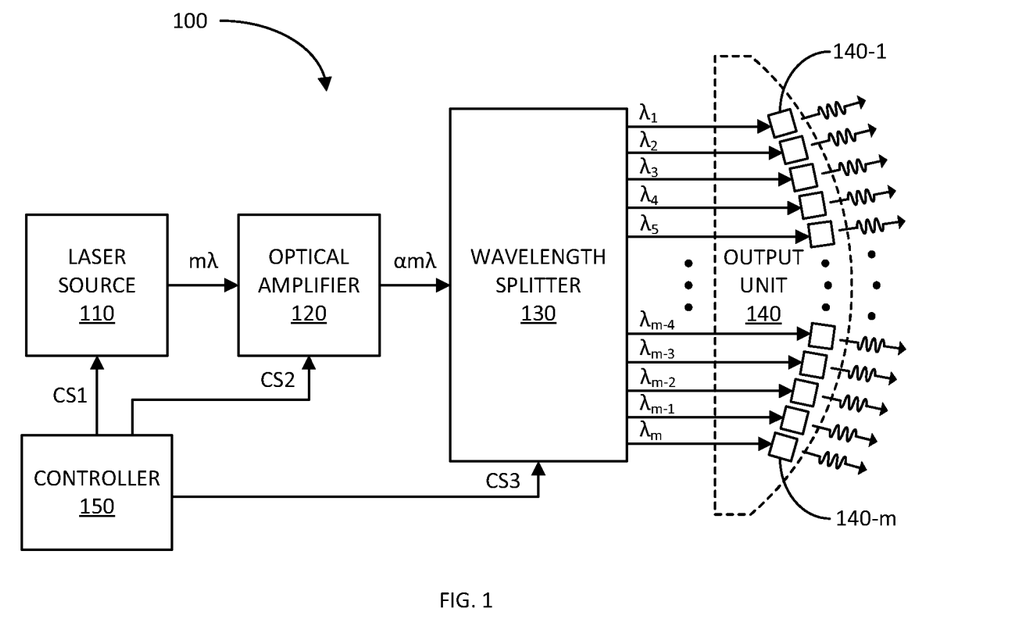
FIG. 1 illustrates a block diagram of an exemplary optical signal transmitter in accordance with an aspect of the disclosure.

FIG. 1 illustrates a block diagram of an exemplary optical signal transmitter 100 in accordance with an aspect of the disclosure. The optical signal transmitter 100 includes a laser source 110, an optical amplifier 120, a wavelength splitter 130, an output unit 140, and a controller 150. The output unit 140, in turn, may include a set of emission ports 140-1 to 140-$m$ for transmission of a set of optical signals, respectively.

The laser source 110 is configured to generate an optical signal m$\lambda$ based on a control signal (CS1) generated by the controller 150. Based on the control signal (CS1), the laser source 110 may be configured or programmed to generate a broadband-mode optical signal m$\lambda$, e.g., an optical signal including a set of distinct wavelengths $\lambda_1$ to $\lambda_m$ generated simultaneously. Additionally, based on the control signal (CS1), the laser source may be configured or programmed to generate a switched-mode (e.g., time-multiplexed) optical signal m$\lambda$, e.g., an optical signal including a set of distinct wavelengths $\lambda_1$ to $\lambda_m$ generated at distinct times $t_1$ to $t_m$, respectively. Further, based on the control signal (CS1), the laser source 110 may be configured or programmed to generate a combined broadband- and switched-mode optical signal m$\lambda$, e.g., an optical signal with a subset of distinct wavelengths $\lambda_i$ to $\lambda_j$, generated simultaneously at time $t_1$ and another subset of distinct wavelengths $\lambda_k$ to $\lambda_l$ generated simultaneously at a different time $t_2$.

For additional optical signal diversity, the laser source 110, based on the control signal (CS1), may be configured or programmed to generate a continuous wave (CW) and/or pulsed optical signal. For example, the optical signal m$\lambda$ may include a set of distinct wavelengths $\lambda_1$ to $\lambda_m$, the entire set being generated as continuous wave (CW) optical signal. Alternatively, the optical signal m$\lambda$ may include a set of distinct wavelengths $\lambda_1$ to $\lambda_m$, the entire set being generated as pulsed optical signal. Alternatively, the optical signal m$\lambda$ may include a set of distinct wavelengths $\lambda_1$ to $\lambda_m$, whereby a subset $\lambda_i$ to $\lambda_j$ may be generated as a continuous wave (CW) optical signal and another subset $\lambda_k$ $\lambda_l$ generated as a pulsed optical signal.

With regard to pulsed optical signal, the laser source 110, based on the control signal (CS1), may be configured or programmed to generate an optical signal m$\lambda$ with one or more distinct pulse repetition rate. For example, the optical signal may include a set of distinct wavelengths $\lambda_1$ to $\lambda_m$, each wavelength modulated with a substantially constant pulse repetition rate PR. Alternatively, the optical signal may include a set of distinct wavelengths $\lambda_1$ to $\lambda_m$ modulated with a set of distinct pulse repetition rates $PR_1$ to $PR_m$, respectively. Alternatively, the optical signal may include a subset of distinct wavelengths $\lambda_i$ to $\lambda_j$ modulated with a first pulse repetition rate $PR_1$ and another subset of distinct wavelengths $\lambda_k$ to $\lambda_l$ modulated with a second and different pulse repetition rate $PR_2$.

Further, with regard to pulsed optical signal, the laser source 110, based on the control signal (CS1), may be configured or programmed to generate an optical signal m$\lambda$ including a set of wavelengths $\lambda_1$ to $\lambda_m$ independently pulsed in a particular or defined time-based pattern. For example, the optical signal m$\lambda$ may include a set of wavelengths $\lambda_1$ to $\lambda_m$ pulsed in a sequential and/or round-robin manner. Alternatively, the optical signal m$\lambda$ may include a set of wavelengths $\lambda_1$ to $\lambda_m$ pulsed in a random, pseudo-random, other time-based patterns, or combination of time-based patterns.

Further, with regard to pulsed optical signal, the laser source 110, based on the control signal (CS1), may be configured or programmed to generate an optical signal m$\lambda$ including a set of wavelengths $\lambda_1$ to $\lambda_m$ that include one or more wavelengths modulated with a pulse having a particular or defined shape, such as a defined pulse width and/or a defined transition slew rate.

As previously discussed, the wide variety of optical signal $m\lambda$ capable of being produced by the laser source 110 allows for improved reception, detection, and processing of reflected optical signal from target objects-of-interests. The laser source 110 may be configured as a gas laser, a solid state laser, a crystal laser, or other type of laser. Preferably, the laser source 110 may be configured as a single laser to reduce power consumption, design complexity, footprint, weight, and costs.

The optical amplifier 120 is configured to amplify the optical signal $m\lambda$ generated by the laser source 110 by a defined gain $\alpha$ to generate an amplified optical signal $\alpha m\lambda$. The gain $\alpha$ may be set by the controller 150 based on a control signal CS2. The gain $\alpha$ of the optical amplifier 120 should be configured to generate a transmitted optical signal with sufficient power to produce a reflected optical signal off a target object with sufficient power for detection. The optical amplifier 120 may be configured as an erbium-doped fiber amplifier (EDFA), a ytterbium-doped fiber amplifier (YDFA), or an erbium-ytterbium-doped fiber amplifier (EY-DFA).

The wavelength splitter 130 is configured to receive the amplified optical signal $\alpha m\lambda$, and split or separate the amplified optical signal $\alpha m\lambda$ into a set of distinct optical signals consisting of distinct wavelengths $\lambda_1$ to $\lambda_m$, respectively. As discussed further below, this may be done to generate a set of spatially-propagating optical signals to provide a scanning effect. The wavelength splitter 130 may be configured using telecommunications based techniques, such as a wavelength demultiplexer (DMUX). Alternatively, the wavelength splitter 130 may be configured using traditional optical components, such as gratings (e.g., fiber Bragg grating, diffraction gratings, Blazed gratings, volume holographic gratings (VHG), dielectric mirrors, prisms, lenses, etc.). The controller 150 may control the wavelength splitting properties of the wavelength splitter 130 via a control signal CS3.

The set of emission ports 140-1 to 140-$m$ of the output unit 140 receives the separated optical signals $\lambda_1$ to $\lambda_m$ from the wavelength splitter 130, respectively, and transmits them into free space. In one configuration, the set of emission ports 140-1 to 140-$m$ are configured to transmit the optical signals $\lambda_1$ to $\lambda_m$ for propagation via a set of distinct directions, respectively. For example, the set of emission ports 140-1 to 140-$m$ may be configured to disperse the optical signals $\lambda_1$ to $\lambda_m$ in a semi-circle or arc array manner as shown to form a scanning field. Alternatively, the set of emission ports 140-1 to 140-$m$ may be configured to transmit the optical signals $\lambda_1$ to $\lambda_m$ in a substantially parallel manner, or so that the optical signals $\lambda_1$ to $\lambda_m$ intersect at a desired focal point, or in other manners as desired per the particular application of use. Alternatively, the emission ports can each be a traditional LIDAR scanning system. Again, the emission ports can be arranged in a spatial way, either forming a scanning pattern or just providing a distributed point cloud in any orientation.

The optical signal transmitter 100 allows for optically scanning a wide area for objects without requiring any moving parts. For example, by controlling the wavelength of the optical signal $m\lambda$ generated by the laser source 110, the direction of the transmitted optical signal may be controlled. For instance, if the laser source 110 is programmed to generate the optical signal $m\lambda$ with a wavelength of $\lambda_1$, then the direction of propagation of the transmitted optical signal by emission port 140-1 is upward and to the right, as illustrated in FIG. 1. On the other hand, if the laser source 110 is programmed to generate the optical signal $m\lambda$ with a wavelength of $\lambda_m$, then the direction of propagation of the transmitted optical signal by emission port 140-$m$ is downward and to the right, as illustrated in FIG. 1.

If the laser source 110 is configured to sequence the wavelength of the optical signal $m\lambda$ from $\lambda_1$ to $\lambda_m$ in a round-robin manner, the optical signal transmitter 100 may be configured to scan a field in a manner similar to a rotating or oscillating radar without requiring any moving parts. Alternatively, the wavelengths $\lambda_1$ to $\lambda_m$ may be simultaneous transmitted to effectuate a faster scanning. This non-moving-parts scan has significant advantages as moving parts typically require substantial power, large footprint, heavier items, maintenance and repair, and other undesired attributes. Combining the spatial transmission advantage with the optical signal diversity (e.g., distinct wavelengths, continuous wave (CW), pulsed, pulse repetition rate, pulse-time based patterns, and pulse shaping), the laser source 110 may be flexibly configured to provide high resolution detection and/or mapping of target objects.

For unambiguous pulse purposes, the controller 150 may be configured to generate the control signal CS3 so that the wavelength splitting performed by the wavelength splitter 130 varies on a time-basis. As an example, at a first pulse transmission time t1, the controller 150 may configure the wavelength splitter 130 to split the optical signal $\alpha m\lambda$ so that optical signals consisting of wavelengths $\lambda_1$ to $\lambda_m$ are sent to emission points 140-1 to 140-$m$, respectively. At a second pulse transmission time t2, the controller 150 may configure the wavelength splitter 130 to split the optical signal $\alpha m\lambda$ so that optical signals consisting of wavelengths $\lambda_m$, $\lambda_1$ to $\lambda_{m-1}$ are sent to emission points 140-1 to 140-$m$, respectively. In this way, each of the emission ports 140-1 to 140-$m$ transmit an optical pulse with a wavelength that differs for consecutive transmissions to provide unambiguous pulses as previously discussed.

As previous mentioned, the controller 150, via the control signal CS1, may configure the laser source 110 to generate a CW optical signal $m\lambda$. Additionally, the controller 150, via the control signal CS3, may configure the wavelength splitter 130 to change the wavelengths of the optical signals applied to the emission ports 140-1 to 140-$m$. This may be done in a CW LIDAR system. Changing the wavelengths of CW optical signals may find its application in air pollution detection. The targeted chemicals may have different absorption at different wavelength, or different chemicals have different characteristic absorption wavelength. Using multiple wavelength in alternating fashion allows detection of multiple chemical components and/or obtaining more information of the same chemicals.

Figure 2:
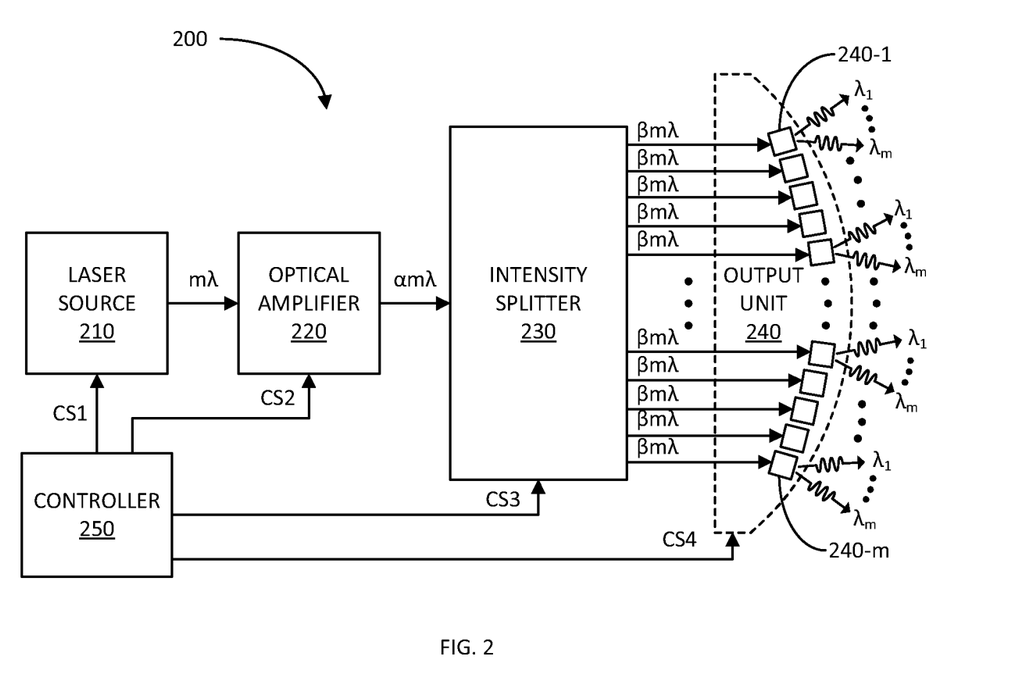
FIG. 2 illustrates a block diagram of another exemplary optical signal transmitter in accordance with another aspect of the disclosure.

FIG. 2 illustrates a block diagram of another exemplary optical signal transmitter 200 in accordance with another aspect of the disclosure. The optical signal transmitter 200 is similar to that of optical signal transmitter 100 with the exception that the wavelength splitting occurs at the output unit and the wavelength splitter is replaced with an intensity splitter.

More specifically, the optical signal transmitter 200 includes a laser source 210, an optical amplifier 220, an intensity splitter 230, an output unit 240, and a controller 250. Based on a control signal (CS1) generated by the controller 250, the laser source 210 may be configured or programmed to generate an optical signal $m\lambda$ with the same signal diversity (e.g., distinct wavelengths $\lambda_1$ to $\lambda_m$, continuous wave (CW) and/or pulsed, one or more pulse repetition periods, time-based pattern or combination of patters, specified pulse shape), as described with reference to laser source 110. Similarly, the laser source 210 may be configured as a gas laser, solid state laser, crystal laser, etc.

In a like manner, the optical amplifier 220 is configured to amplify the optical signal mλ with a gain α to generate an amplified optical signal αmλ. The gain α should be configured to produce a transmitted optical signal with sufficient power that results in a received optical signal reflected off a target object that may be detected for processing to obtain the desired information associated with the target object. Similarly, via a control signal CS2, the controller 250 may configure the gain α of the optical amplifier 220.

The intensity splitter 230 receives the amplified optical signal αmλ from the optical amplifier 220, and power or intensity splits the optical signal αmλ into a set of optical signals βmλ. If the intensity splitter 230 is a balanced splitter, each of the set of optical signals βmλ has an intensity given by β, where β is substantially equal to α/m, as the set of optical signals includes m signals. Each of the optical signals βmλ includes the set of distinct wavelengths $\lambda_1$ to $\lambda_m$. As an example, the intensity splitter 230 may be implemented using an optical coupler or a set of optical switches. Via a control signal CS3, the controller 250 may configure the intensity splitter 230 to provide different splitting ratios for variable intensities at the emission ports 240-1 to 240-m, respectively.

The output unit 240 includes a set of emission ports 240-1 to 240-m configured to receive the set of optical signals βmλ from the intensity splitter 230, respectively. Unlike the set of emission ports 140-1 to 140-m of the output unit 140 of the optical signal transmitter 100, the set of emission ports 240-1 to 240-m are configured as spot splitters, each one can emit a set of transmit optical signals $\lambda_1$ to $\lambda_m$ into free space. Similar to the output unit 140, the set of emission ports 240-1 to 240-m may be configured to emit the set of optical signals $\lambda_1$ to $\lambda_m$ in a desired spatial pattern, such as a semi-circle or arc array as illustrated, or in other manners as desired by the application in use. The controller 250 may provide a control signal CS4 to the output unit 240 to configure the wavelength splitting properties of each of the emission ports 240-1 to 240-m.

Similar to the previous optical signal transmitter 100, the optical signal transmitter 200 may be configured to emit the set of optical signals $\lambda_1$ to $\lambda_m$ to provide a scanning effect. For example, the laser source 210 may generate the optical signal mλ with a sequencing of the wavelengths from $\lambda_1$ to $\lambda_m$ in a round robin manner at each emission port to provide unambiguous pulses. This produces a repetitive scanning of a target field similar to an oscillating or rotating radar. Alternatively, the laser source 210 may generate the optical signal mλ to simultaneously include all wavelengths from $\lambda_1$ to $\lambda_m$ to provide a simultaneous scanning effect. Again, as the scan is effectuated without any moving parts, the optical signal transmitter 200 has many advantages over transmitters requiring moving parts to effectuate scanning. In this way as well, effectively each emission port is the equivalent to a traditional scanning LIDAR system.

Figure 3:
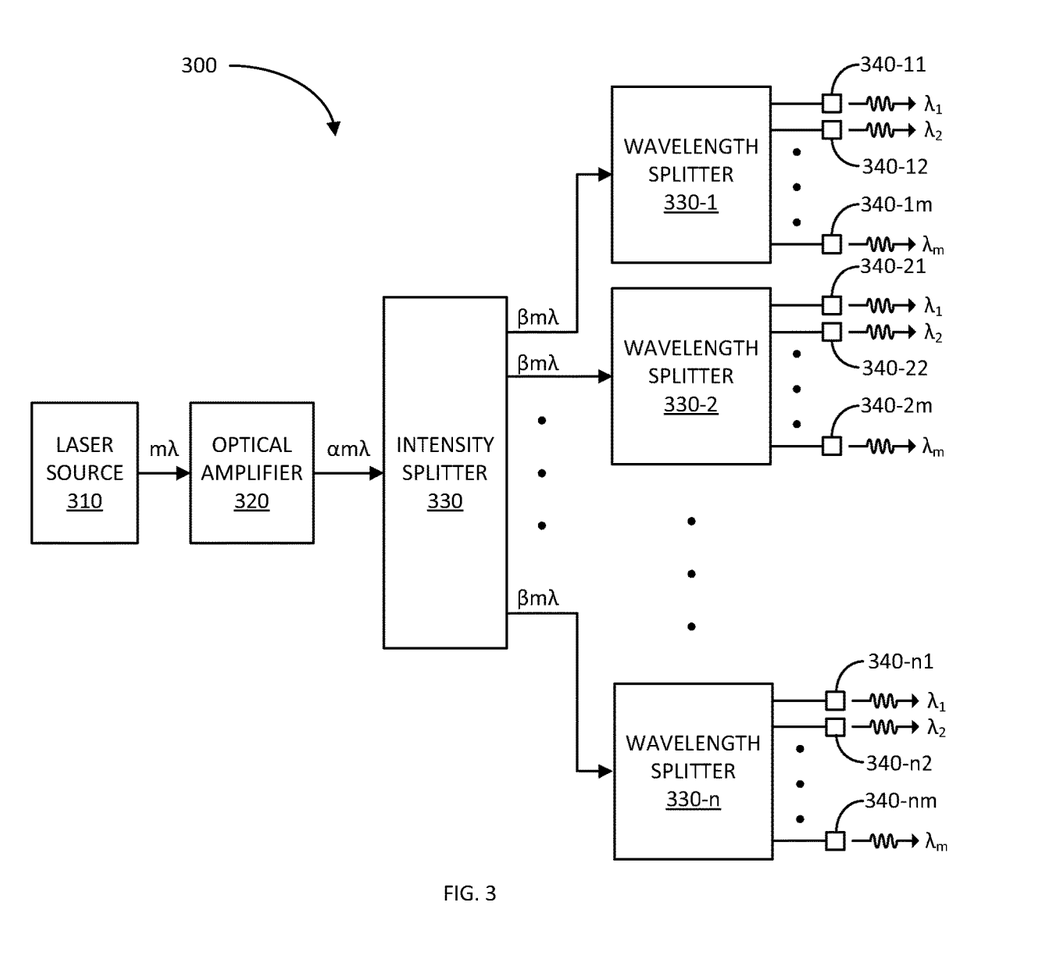
FIG. 3 illustrates a block diagram of another exemplary optical signal transmitter in accordance with another aspect of the disclosure.

FIG. 3 illustrates a block diagram of another exemplary optical signal transmitter 300 in accordance with another aspect of the disclosure. The optical signal transmitter 300 may be somewhat of a combination of optical signal transmitters 100 and 200, but configured to provide additional emission ports or additional LIDAR system units.

In particular, the optical signal transmitter 300 includes a laser source 310 configured to generate a broadband signal mλ (e.g., including a set of wavelengths $\lambda_1$ to $\lambda_m$). The optical signal transmitter 300 further includes an optical amplifier 320 configured to amplify the broadband signal mλ with a gain α to generate an amplified broadband signal αmλ. Additionally, the optical signal transmitter 300 includes an intensity splitter 330 configured to intensity split the amplified broadband signal αmλ to generate a set of broadband signals βmλ. If the intensity splitter 330 is balanced, then β=α/n. However, it shall be understood that the intensity splitter 330 need not be balanced, and that the split ratios of the set of broadband signals βmλ can be set by a controller (not shown in FIG. 3).

The optical signal transmitter 300 further includes a set of wavelength splitters 330-1 to 330-n configured to receive the set of broadband signals βmλ, and generate a set of narrowband wavelength signals $\lambda_1$ to $\lambda_m$, respectively. The set of narrowband wavelengths $\lambda_1$ to $\lambda_m$ generated by wavelength splitters 330-1 to 330-n are provided to sets of emission ports (or separate LIDAR systems) 340-11-340-1m to 340-n1-340-nm, respectively. Thus, using the intensity splitter 330 to generate a set of n broadband signals βmλ and the set of n wavelength splitters 330-1 to 330-n to each generate the set of narrowband signals $\lambda_1$ to $\lambda_m$, a total of n×m optical signals may be generated by optical signal transmitter 300 to increase the spatial resolution of the optical signal transmitted.

Although not shown, the optical signal transmitter 300 may include a controller for controlling the various parameters of the components. These parameters include the broadband signal mλ generated by the laser source 310; the gain α of the optical amplifier 320; the splitting ratios of the intensity splitter 330; and the wavelength splitting of the wavelength splitters 330-1 to 330-n.

Figure 4:
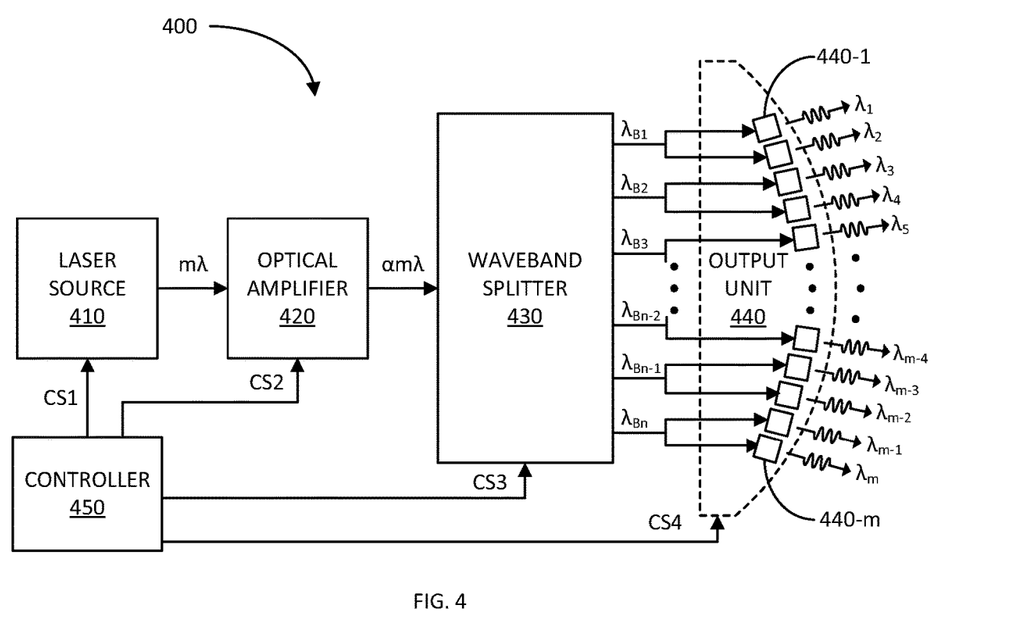
FIG. 4 illustrates a block diagram of yet another exemplary optical signal transmitter in accordance with another aspect of the disclosure.

FIG. 4 illustrates a block diagram of yet another exemplary optical signal transmitter 400 in accordance with another aspect of the disclosure. The optical signal transmitter 400 is somewhat of a combination of optical signal transmitters 100 and 200. That is, instead of the wavelength splitter 130 of optical signal transmitter 100, the optical signal transmitter 400 includes a waveband splitter to split the amplified signal into a set of wavebands. The optical signal transmitter 400 includes an output unit configured to further separate the set of wavebands into a set of wavelengths $\lambda_1$ to $\lambda_m$ for transmission.

More specifically, the optical signal transmitter 400 includes a laser source 410, an optical amplifier 420, a waveband splitter 430, an output unit 440, and a controller 450. Based on a control signal (CS1) generated by the controller 450, the laser source 410 may be configured or programmed to generate an optical signal mλ with the same signal diversity (e.g., distinct wavelengths $\lambda_1$ to $\lambda_m$, continuous wave (CW) and/or pulsed, one or more pulse repetition periods, time-based pattern or combination of patters, specified pulse shape), as described with reference to laser source 110. Similarly, the laser source 410 may be configured as a gas laser, solid state laser, crystal laser, etc.

In a like manner, the optical amplifier 420 is configured to amplify the optical signal mλ with a gain α to generate an amplified optical signal αmλ. The gain α should be configured to produce a transmitted optical signal with sufficient power that results in a received optical signal reflected off a target object that may be detected for processing to obtain the desired information about the target object. Again, via control signal CS2, the controller 450 may configure the gain α of the optical amplifier 420.

The waveband splitter 430 receives the amplified optical signal αmλ from the optical amplifier 420, and waveband splits the optical signal αmλ into a set of optical signals having distinct wavelength bands $\lambda_{B1}$ to $\lambda_{Bn}$. Each of the optical signals $\lambda_{B1}$ to $\lambda_{Bn}$ may include a distinct subset of the set of wavelengths $\lambda_1$ to $\lambda_m$. For instance, optical signal $\lambda_{B1}$ consists of only wavelengths between $\lambda_1$ and $\lambda_2$; optical signal $\lambda_{B2}$ consists of only wavelengths between $\lambda_3$ and $\lambda_4$; and so on to optical signal $\lambda_{Bn}$ consisting of only wavelengths between $\lambda_{m-1}$ and $\lambda_m$. Similarly, the wavelength splitter 430 may be configured using telecommunications-based techniques, such as a wavelength demultiplexer (DMUX). Alternatively, the waveband splitter 430 may be configured using traditional optical-based components, such as gratings (e.g., fiber Bragg grating, diffraction gratings, Blazed gratings, volume holographic gratings (VHG), dielectric mirrors, prisms, lenses, etc). Via a control signal CS3, the controller 450 may be configured to control the waveband distribution of the wavelength splitter 430 (e.g., each of the wavebands need not be of the same size).

The output unit 440 includes a set of emission ports 440-1 to 440-m configured to receive the set of optical signals $\lambda_{B1}$ to $\lambda_{Bn}$ from the waveband splitter 430, respectively. The set of emission ports 440-1 to 440-m are configured as spot splitters to separate the optical signals $\lambda_{B1}$ to $\lambda_{Bn}$ into a set of transmit optical signals $\lambda_1$ to $\lambda_m$, respectively. In this example, each of the separated wavebands is sent to a pair of emission ports. For example, optical waveband signal $\lambda_{B1}$ is sent to emission ports 440-1 and 440-2. Similarly, optical waveband signal $\lambda_{B2}$ is sent to emission ports 440-3 and 440-4. And, optical waveband signal $\lambda_{Bn}$ is sent to emission ports 440-m-1 and 440-m. It shall be understood that each optical waveband signal may be sent to any number of emission ports. The controller 450 may provide a control signal CS4 to the output unit 340 to configure the wavelength splitting of each of the emission ports 440-1 to 440-m.

The set of emission ports 440-1 to 440-m emits the set of optical signals $\lambda_1$ to $\lambda_m$ into free space. Similar to the output unit 140, the set of emission ports 440-1 to 440-m may be configured to emit the set of optical signals $\lambda_1$ to $\lambda_m$ in a desired spatial pattern, such as a semi-circle or arc array as illustrated, or in other manners as desired by the application in use.

Similar to the previous optical signal transmitters 100 and 200, the optical signal transmitter 400 may be configured to emit the set of optical signals $\lambda_1$ to $\lambda_m$ to provide a scanning effect as well as unambiguous pulses. For example, the laser source 410 may generate the optical signal $m\lambda$ with a sequencing of the wavelengths from $\lambda_1$ to $\lambda_m$ in a round robin manner. This produces a repetitive scanning of a target field similar to an oscillating or rotating radar. Alternatively, the laser source 410 may generate the optical signal $m\lambda$ to simultaneously include all wavelengths from $\lambda_1$ to $\lambda_m$ to provide a simultaneous scanning effect. Again, as the scan is effectuated without any moving parts, the optical signal transmitter 400 has many advantages over transmitters requiring moving parts to effectuate scanning.

Figure 5:
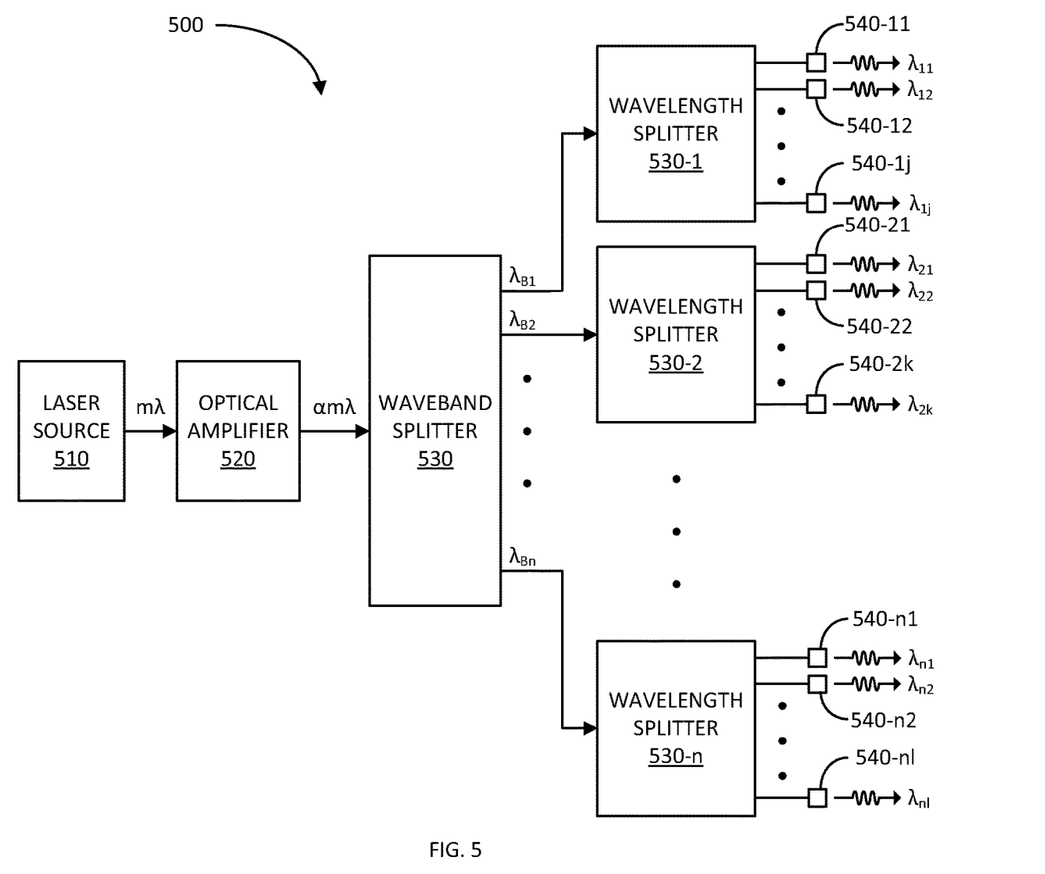
FIG. 5 illustrates a block diagram of still another exemplary optical signal transmitter in accordance with another aspect of the disclosure.

FIG. 5 illustrates a block diagram of another exemplary optical signal transmitter 500 in accordance with another aspect of the disclosure. The optical signal transmitter 500 may be somewhat of a combination of optical signal transmitters 100 and 400, but configured to provide additional emission ports or additional LIDAR system units.

In particular, the optical signal transmitter 500 includes a laser source 510 configured to generate a broadband signal $m\lambda$. The optical signal transmitter 500 further includes an optical amplifier 520 configured to amplify the broadband signal $m\lambda$ with a gain $\alpha$ to generate an amplified broadband signal $\alpha m\lambda$. Additionally, the optical signal transmitter 500 includes a waveband splitter 530 configured to waveband split the amplified broadband signal $\alpha m\lambda$ to generate a set of distinct sub-bands signals $\lambda_{B1}$ to $\lambda_{Bn}$. If the waveband splitter 530 is balanced, then the bandwidths the sub-bands signals $\lambda_{B1}$ to $\lambda_{Bn}$ are the same. However, it shall be understood that the waveband splitter 530 need not be balanced, and the sub-bands signals $\lambda_{B1}$ to $\lambda_{Bn}$ may have different bandwidths, which may be set by a controller (not shown in FIG. 5).

The optical signal transmitter 500 further includes a set of wavelength splitters 530-1 to 530-n configured to receive the set of sub-bands signals $\lambda_{B1}$ to $\lambda_{Bn}$, and generate a set of narrowband wavelength signals $\lambda_{11}$ to $\lambda_{1j}$ to $\lambda_{n1}$ to $\lambda_{nl}$, respectively. The set of narrowband wavelengths $\lambda_{11}$ to $\lambda_{1j}$ to $\lambda_{n1}$ to $\lambda_{nl}$ generated by wavelength splitters 530-1 to 530-n are provided to sets of emission ports (or separate LIDAR systems) 540-11-540-1j to 540-n1-540-nl, respectively. Thus, using the waveband splitter 530 to generate a set of n sub-bands signals $\lambda_{B1}$ to $\lambda_{Bn}$ and the set of n wavelength splitters 530-1 to 530-n to generate distinct sets of narrowband signals $\lambda_{11}$ to $\lambda_{1j}$ to $\lambda_{n1}$ to $\lambda_{nl}$, a total of n×m distinct optical signals may be generated by optical signal transmitter 500 to increase the spatial resolution and unambiguous pulses of the optical signal transmitted.

Although not shown, the optical signal transmitter 500 may include a controller for controlling the various parameters of the components. These parameters include the broadband signal $m\lambda$ generated by the laser source 510; the gain $\alpha$ of the optical amplifier 520; the waveband splitting of the waveband splitter 530; and the wavelength splitting of the wavelength splitters 530-1 to 530-n.

Figure 6:
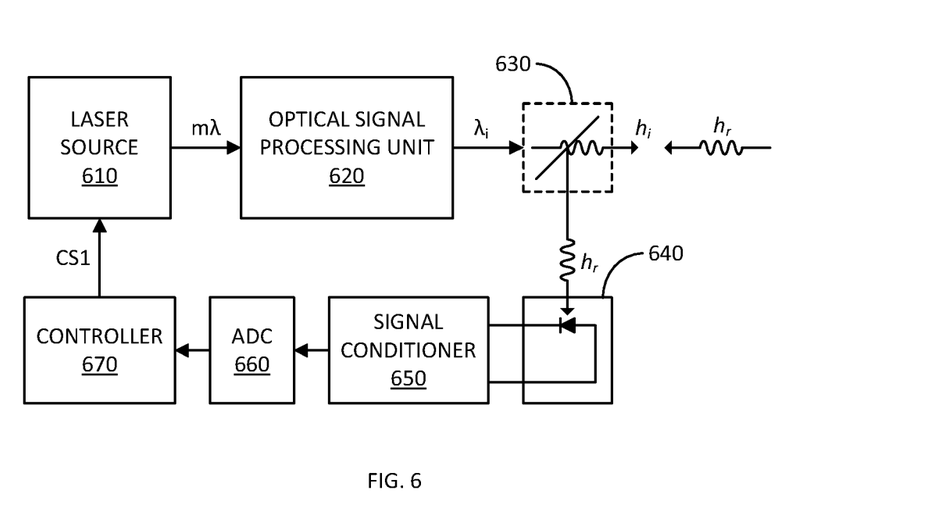
FIG. 6 illustrates a block diagram of an exemplary light detection and ranging (LIDAR) apparatus in accordance with another aspect of the disclosure.

FIG. 6 illustrates a block diagram of an exemplary light detection and ranging (LIDAR) apparatus 600 in accordance with another aspect of the disclosure. The LIDAR apparatus 600 includes an optical signal transmitter, such as any of optical signal transmitter 100, 200, 300, 400, or 500 previously discussed. In this regards, the LIDAR apparatus 600 includes a laser source 610 (e.g., similar to any of the laser source 110, 210, 310, 410, or 510) and an optical signal processing unit 620, which may include an optical amplifier (e.g., any one of the optical amplifier 120, 220, 320, 420, or 520), an optical splitter (e.g., any one of the wavelength splitters 130, 330-1 to 330-n, or 530-1 to 530-n, intensity splitters 230 or 330, or waveband splitter 430 or 530), and an emission port (e.g., any of emission ports 140-1 to 140-m, 240-1 to 240-m, 340-11 to 340-nm, 440-1 to 440-m, or 540-11 to 540-nl) to generate a transmit optical signal $h_t$.

In this example, each optical emission port may include an optical coupler 630 through which the transmit optical signal $h_t$ propagates, and via which a reflected optical signal $h_r$ is received and directed to a receiver of the LIDAR apparatus 600. For each emission port, the receiver of the LIDAR apparatus 600 may include a photodiode or photodetector 640, a signal conditioner 650, and an analog-to-digital converter (ADC) 660. However, using multiplexers and other devices, the receiver may be configured to consolidate such of these modules for processing a plurality of optical signals received from the target object.

The photodetector 640 generates an electrical signal in response to the received optical signal $h_r$. The signal conditioner 650 performs any number of signal conditioning operations, such as amplification, filtering, noise reduction, to condition the electrical signal generated by the photodetector 640 suitable for analog-to-digital conversion. Accordingly, the ADC 660 converts the conditioned electrical signal into a digital signal and provides it to a controller 670.

The controller 670 operates on both the transmitter and receiver. For example, via the control signal (CS1), the controller 670 may configure the optical signal mλ generated by the laser source 610 including the specific set of wavelengths $\lambda_1$ to $\lambda_m$, whether if any of the wavelengths $\lambda_1$ to $\lambda_m$ are generated as a continuous wave (CW), whether if any of the wavelengths $\lambda_1$ to $\lambda_m$ are generated as a pulse optical signal and associated characteristics, such as the pulse repetition period, time-based pattern, and pulse shape including pulse width and transition slew rate. Additionally, for ranging and other purposes, the controller 670 may record the time $t_a$ at which the optical signal mλ is generated.

Regarding the receiver, the controller 670 records the time $t_b$ the digital signal associated with the reflected optical signal $h_r$ is received. Using the time difference $t_b-t_a$ and subtracting delays associated with the transmit and receive optical signals propagating and being process within the LIDAR system, the distance to the target object may be determined. More complex processing may be incorporated into the LIDAR system 600 for determining such target information as the velocity and/or acceleration of the target object. Using Doppler wavelength shifts and electronics configured to ascertain the wavelengths shifts, such velocity and acceleration information of the target object may be determined.

In the description, the optical connections between devices have been symbolically represented as arrows. Such optical connections may include any type of waveguide, which is defined herein as any component that steers electromagnetic radiation. Such waveguides may include optical fibers, nanowires, free space optics, metal waveguides, photonic crystals, and others.

Figure 7:
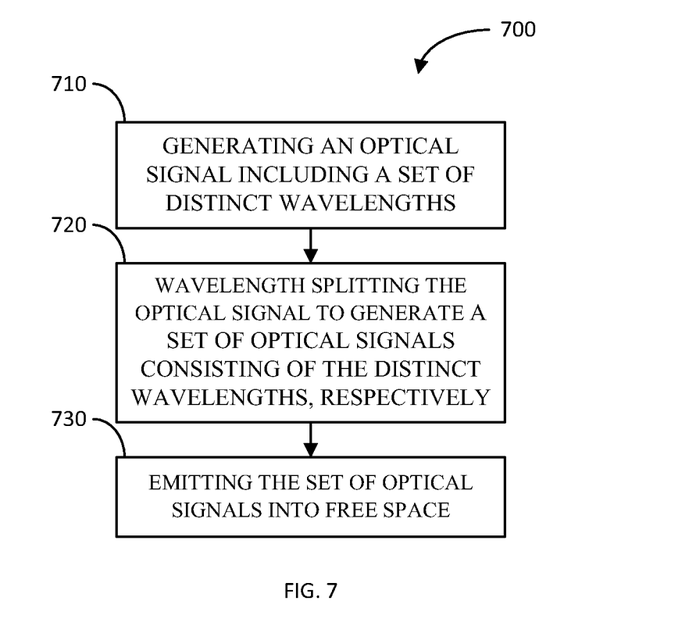
FIG. 7 illustrates a flow diagram of an exemplary method of transmitting a set of optical signals in accordance with another aspect of the disclosure.

FIG. 7 illustrates a flow diagram of an exemplary method 700 of transmitting a set of optical signals in accordance with another aspect of the disclosure.

The method 700 includes generating an optical signal including a set of distinct wavelengths (block 710). An example of a means for generating an optical signal including a set of distinct wavelengths includes any of the laser sources 110, 210, 310, 410, 510, or 610 described herein.

The method 700 also includes wavelength splitting the optical signal to generate a set of optical signals consisting of the distinct wavelengths, respectively (block 720). An example of means for wavelength splitting the optical signal to generate a set of optical signals consisting of the distinct wavelengths, respectively, include the wavelength splitter 130 of optical signal transmitter 100, the set of emission ports 240-1 to 240-m of optical signal transmitter 200, the wavelength splitters 330-1 to 330-n of optical signal transmitter 300, the set of emission ports 440-1 to 440-m of optical signal transmitter 400, the wavelength splitters 530-1 to 530-n of optical signal transmitter 500, or the optical signal processing unit 620 of the LIDAR apparatus 600.

The method 700 further includes emitting the set of optical signals into free space (block 730). An example of means for emitting the set of optical signals into free space include the set of emission ports 140-1 to 140-m of optical signal transmitter 100, the set of emission ports 240-1 to 240-m of optical signal transmitter 200, the set of emission ports 340-11 to 340-nm of optical signal transmitter 300, the set of emission ports 440-1 to 440-m of optical signal transmitter 400, the set of emission ports 540-11 to 540-nl of optical signal transmitter 500, or a set of the optical couplers 630 of the LIDAR system 600.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus, comprising:
   a laser source configured to generate an optical signal including a set of distinct wavelengths;
   a set of emission ports configured to emit a set of optical signals consisting of the distinct wavelengths into free space, respectively, wherein the set of optical signals is based on the optical signal; and
   a controller configured to:
   cause the set of emission ports to vary the emission of the set of optical signals in terms of wavelengths on a time-basis; and
   control the laser source to sequence the set of distinct wavelengths of the optical signal on a time-basis, wherein the sequence of the set of distinct wavelengths of the optical signal is performed in a round-robin manner.

2. The apparatus of claim 1, wherein the set of emission ports are configured to emit the set of optical signals for propagation along a set of distinct directions, respectively.

3. The apparatus of claim 2, wherein the set of distinct directions form a substantially semi-circular or arc array of directions.

4. The apparatus of claim 1, wherein the set of emission ports are configured to wavelength split the optical signal to generate the set of optical signals consisting of distinct wavelengths, respectively.

5. The apparatus of claim 4, wherein each of the emission ports comprises a spot splitter, a collimator, a bare optical fiber, or a fiber end.

6. The apparatus of claim 1, further comprising a wavelength splitter configured to wavelength split the optical signal to generate the set of optical signals consisting of distinct wavelengths, respectively, wherein the set of optical signals are sent to the set of emission ports for emission into free space, respectively.

7. The apparatus of claim 6, wherein the wavelength splitter comprises a demultiplexer.

8. The apparatus of claim 6, wherein the wavelength splitter comprises a grating, a dielectric mirror, a prism, or a lens.

9. The apparatus of claim 6, wherein the wavelength splitter comprises a fiber Bragg grating, a diffraction grating, a Blazed grating, or a volume holographic grating (VHG).

10. The apparatus of claim 1, further comprising an intensity splitter configured to intensity split the optical signal to generate a second set of optical signals, wherein each of the optical signals of the second set includes the set of distinct wavelengths, and wherein the second set of optical signals are sent to the set of emission ports, respectively.

11. The apparatus of claim 10, wherein the set of emission ports are configured to wavelength split the second set of optical signals to generate the set of optical signals consisting of the distinct wavelengths, respectively.

12. The apparatus of claim 10, wherein the intensity splitter comprises an optical coupler or a set of optical switches.

13. The apparatus of claim 1, further comprising a waveband splitter configured to waveband split the optical signal to generate a second set of optical signals, wherein each of the optical signals of the second set consists of a distinct subset of the set of distinct wavelengths, wherein each optical signal of the second set is sent to two or more of the emission ports, wherein the set of optical signals is based on the second set of optical signals.

14. The apparatus of claim 13, wherein the emission ports are configured to wavelength split the received optical signals of the second set to generate the set of optical signals for emission into free space, respectively.

15. The apparatus of claim 13, wherein the waveband splitter comprises a demultiplexer, a grating, a dielectric mirror, a prism, or a lens.

16. The apparatus of claim 1, further comprising an optical amplifier configured to generate an amplified optical signal by amplifying the optical signal, wherein the set of optical signals is based on the amplified optical signal.

17. The apparatus of claim 16, wherein the optical amplifier comprises an erbium-doped fiber amplifier (EDFA), an ytterbium-doped fiber amplifier (YDFA), or an erbium-ytterbium doped fiber amplifier (EYDFA).

18. The apparatus of claim 1, wherein the entire set of optical signals are continuous wave (CW) optical signals.

19. The apparatus of claim 1, wherein the entire set of optical signals are pulsed optical signals.

20. The apparatus of claim 1, wherein one or more of the set of optical signals are continuous wave (CW) optical signals and wherein another one or more of set of optical signals are pulsed optical signals.

21. The apparatus of claim 1, wherein one or more of the set of optical signals are pulsed optical signals, wherein each of the one or more pulsed optical signals is generated with a defined pulse repetition period, or a defined time-based pattern, or a defined set of time-based patterns, or a defined pulse shape.

22. The apparatus of claim 1, further comprising:
an intensity splitter configured to generate a second set of optical signals; and
a set of wavelength splitters configured to generate the set of optical signals by wavelength splitting the second set of optical signals, respectively.

23. The apparatus of claim 1, further comprising:
a waveband splitter configured to generate a second set of optical signals having distinct wavebands; and
a set of wavelength splitters configured to generate the set of optical signals by wavelength splitting the second set of optical signals, respectively.

24. An apparatus, comprising:
a laser source configured to generate an optical signal including a set of distinct wavelengths;
a set of emission ports configured to emit a set of optical signals consisting of the distinct wavelengths into free space, respectively, wherein the set of optical signals is based on the optical signal;
a controller configured to:
control the laser source to sequence the set of distinct wavelengths of the optical signal on a time-basis, wherein the sequence of the set of distinct wavelengths of the optical signal is performed in a round-robin manner; and
cause the set of emission ports to vary the emission of the set of optical signals in terms of wavelengths on a time-basis; and
a receiver configured to:
receive a second set of optical signals generated as a result of the set of optical signals reflecting off of an object; and
process the second set of optical signals to generate information regarding the object.

25. A method, comprising:
generating an optical signal including a set of distinct wavelengths;
controlling a sequence of the set of distinct wavelengths of the optical signal on a time-basis, wherein the sequence of the set of distinct wavelengths of the optical signal is performed in a round-robin manner;
wavelength and intensity splitting the optical signal to generate a set of optical signals consisting of the distinct wavelengths, respectively;
emitting the set of optical signals into free space; and
varying the emission of the set of optical signals in terms of wavelengths on the time-basis.

26. An apparatus, comprising;
a laser source configured to generate an optical signal including a set of distinct wavelengths;
a set of emission ports configured to emit a set of optical signals consisting of the distinct wavelengths into free space, respectively, wherein the set of optical signals is based on the optical signal;
a waveband splitter configured to waveband split the optical signal to generate the set of optical signals; and
a controller configured to cause the set of emission ports to vary the emission of the set of optical signals in terms of wavelengths on a time-basis, including causing the waveband splitter to vary the waveband splitting on the time-basis such that the distinct wavelengths of the set of optical signals emitted by the set of emission ports vary with time, respectively.

* * * * *